Dec. 30, 1924.
P. ZEHNDER
1,521,264
METHOD AND DEVICE FOR THE PRODUCTION OF HOLLOW BODIES
SUCH AS PIPES, MASTS, AND THE LIKE FROM FERROCONCRETE
Filed May 8, 1923
5 Sheets-Sheet 1
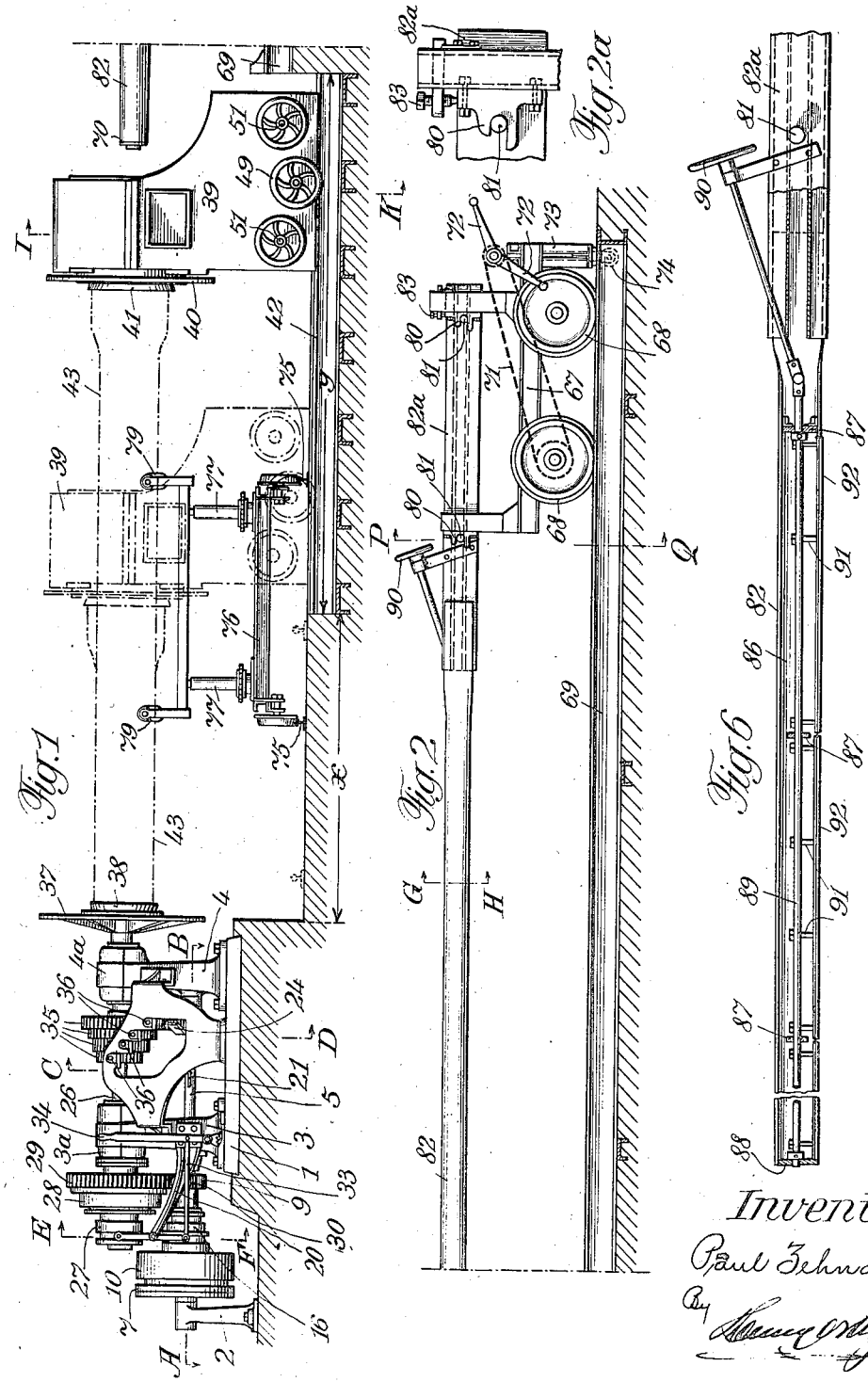
Inventor:
Paul Zehnder,
By
Atty

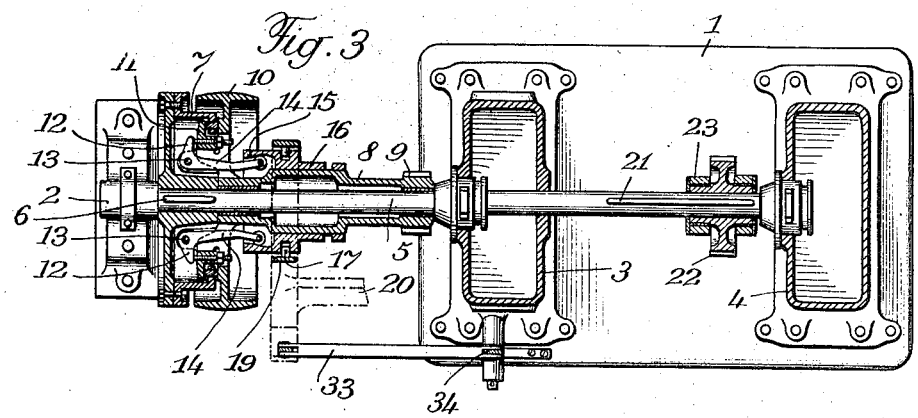
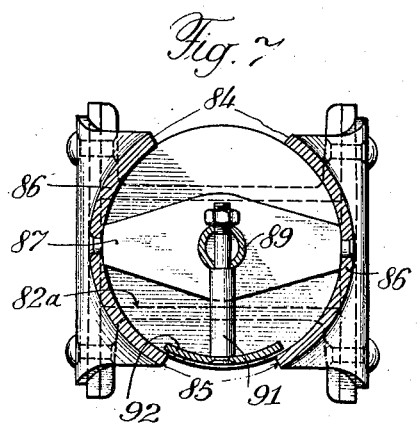
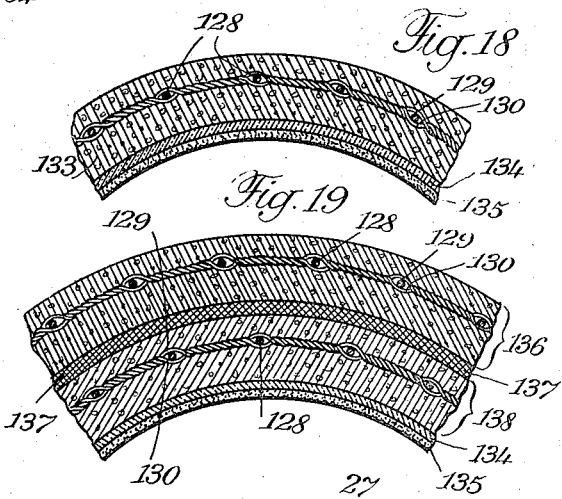
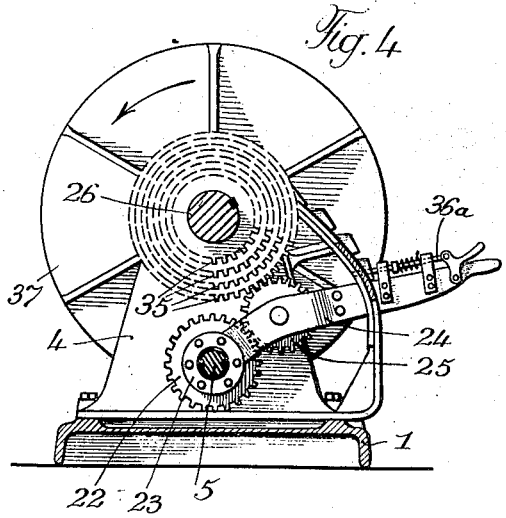
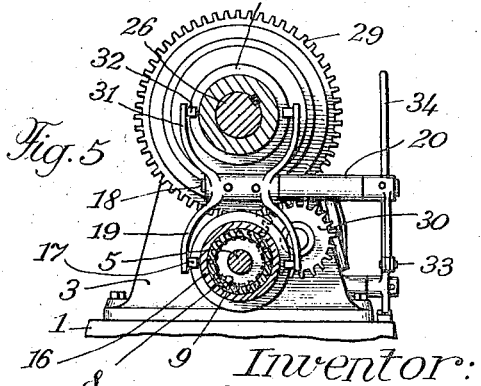

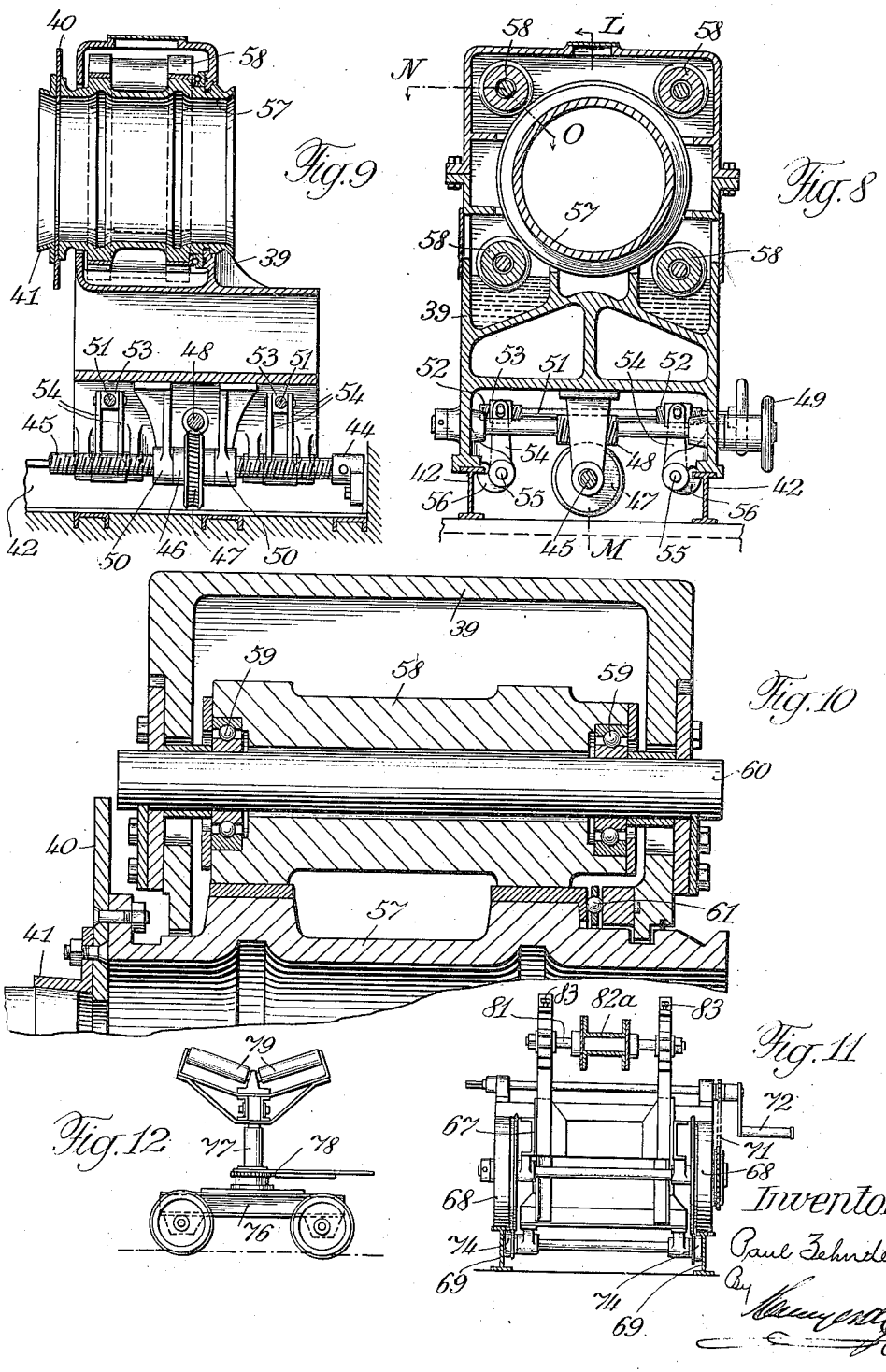

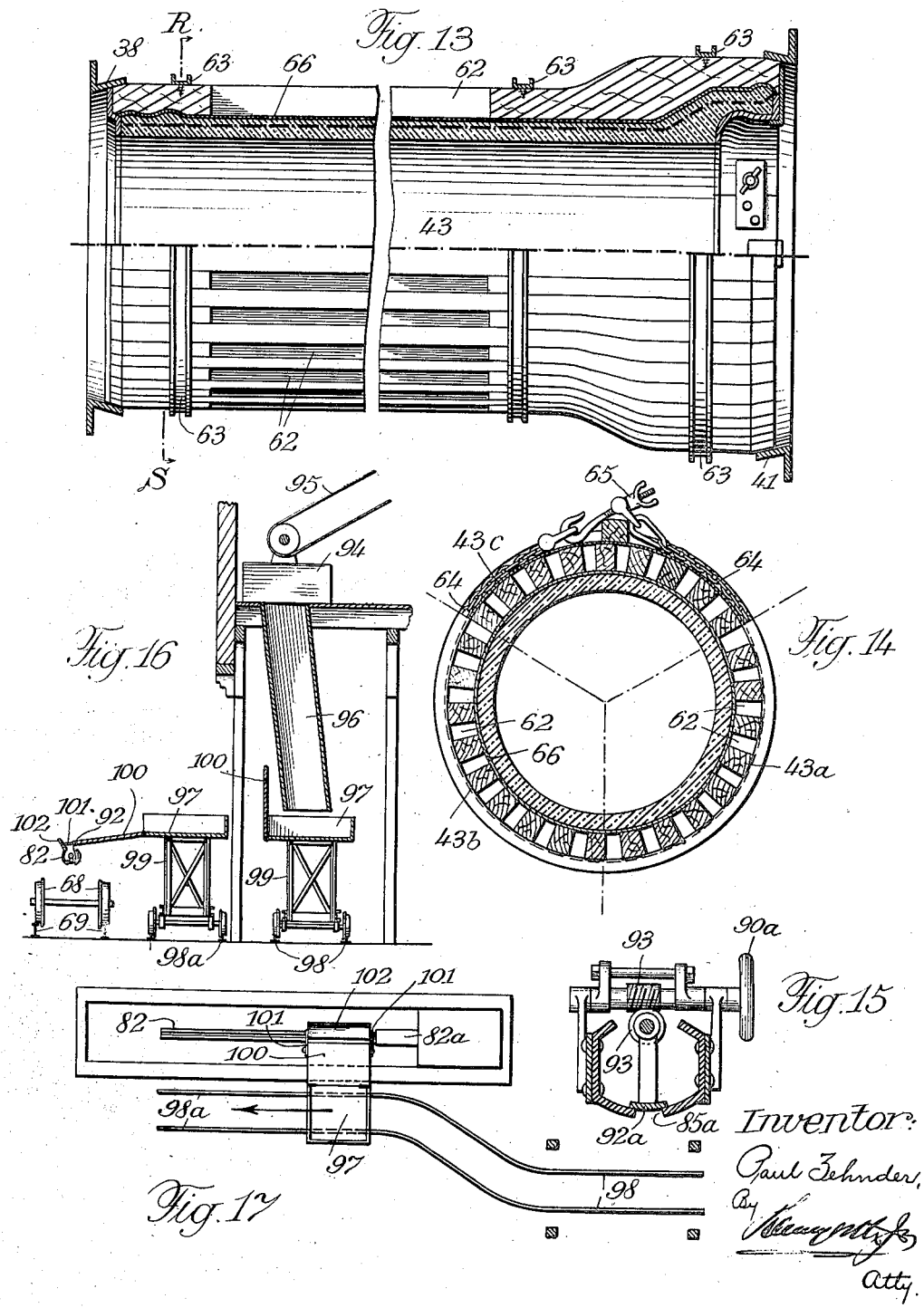

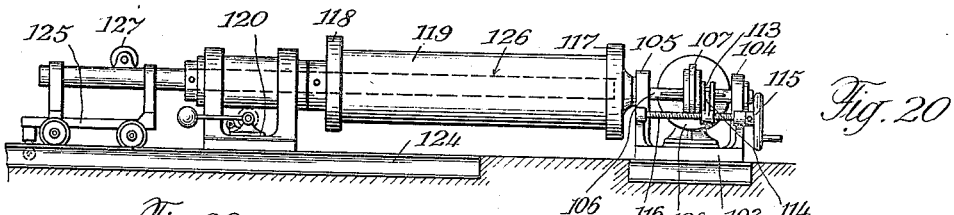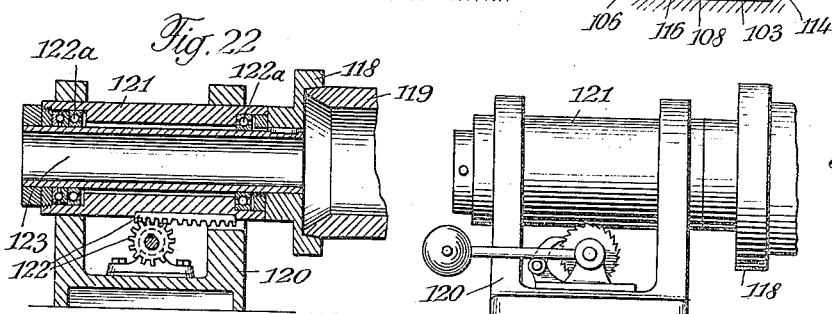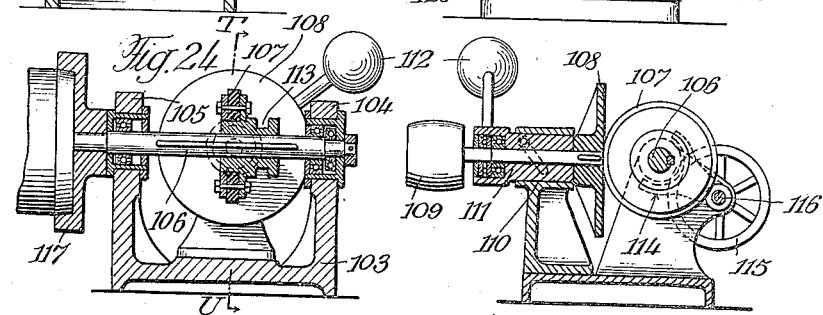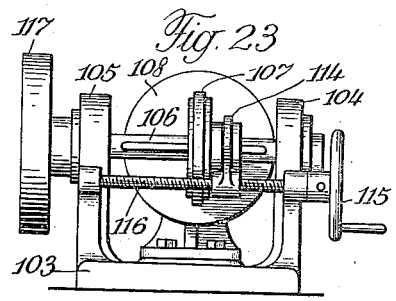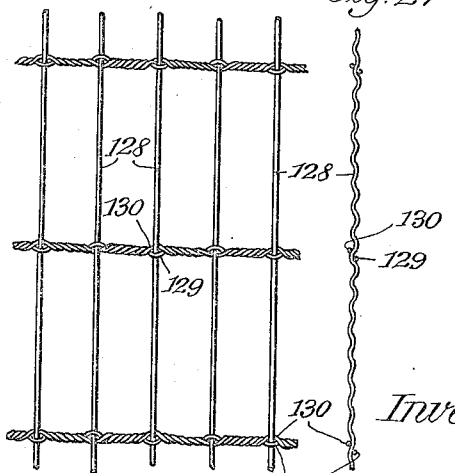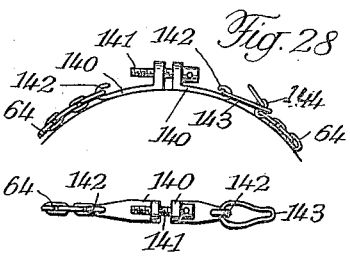

Patented Dec. 30, 1924.

1,521,264

UNITED STATES PATENT OFFICE.

PAUL ZEHNDER, OF LUCERNE, SWITZERLAND, ASSIGNOR TO THE FIRM INTERNATIONALE SIEGWARTBALKEN-GESELLSCHAFT, OF LUCERNE, SWITZERLAND.

METHOD AND DEVICE FOR THE PRODUCTION OF HOLLOW BODIES SUCH AS PIPES, MASTS, AND THE LIKE FROM FERROCONCRETE.

Application filed May 8, 1923. Serial No. 637,504.

*To all whom it may concern:*

Be it known that I, PAUL ZEHNDER, a citizen of the Republic of Switzerland, residing at Lucerne, Switzerland, have invented certain new and useful Improvements in Methods and Devices for the Production of Hollow Bodies Such as Pipes, Masts, and the like from Ferroconcrete, of which the following is a specification, reference being had therein to the accompanying drawing.

This invention relates to a method for the production of hollow bodies, such as pipes, masts and the like from ferroconcrete. By means of this method concrete having the consistency of plastic mortar is thrown by degrees on to the interior wall of an outer-casing or mould revolving on its axis embedding at the same time a reinforcement of iron and upon which an inner-layer of the plastic concrete is centrifugally so deposited that a separation of its component parts, by means of centrifugal action, in accordance with their degrees of specific gravity takes place resulting in a deposit of layers of cement and lime-hydrate one over the other on the inner side of the iron reinforced pipe.

As against the processes so far known in which an outer-casing or mould is used, the concrete in the present method is employed in the plastic state of mortar and not in liquid spray form. Furthermore the plastic concrete is allowed to fall into the pipe mould by degrees, thus avoiding the effects of centrifugal action, in order that the individual component parts of the mass composing the outside layer of the pipe are not separated in accordance with their degrees of specific gravity. On the other hand in opposition to the processes so far known, the interior layer is centrifugally so formed that here an intentional separation of the component parts of the concrete takes place, the result being that a deposit is formed on the inside of the pipe of layers of pure cement and lime-hydrate.

This process can be effected by employing a device consisting of a machine with a fixed head-stock provided with a metal disc and the necessary means for driving said disc at greatly varying speeds so that the outer casing or mould in which the pipe is formed is charged whilst the mould is rotating at slow speed and the compression of the concrete so charged is brought about by the rotary movement being afterwards considerably increased. The machine is also provided with a tail-stock to which a metal socket ring capable of revolving is fixed coaxial to the metal disc on the head-stock. This tail-stock in opposition to that of other machines so far in use is movable and can be easily placed at distances from about three feet to sixteen feet in direct line from the fixed head-stock, and can be tightly fixed at the distance required thus permitting hollow bodies of various lengths graduating from about three feet minimum length to sixteen feet maximum length to be produced on one and the same machine. The capability of the afore described machine to produce hollow bodies of various lengths renders it far more productive than those so far known.

In addition, the machine is provided with a mobile material charging device i. e. a travelling spout or channel placed behind the tail-stock and fulfilling the function of charging the outer-casing or mould with the plastic concrete. This spout or channel in opposition to devices of a similar character known so far, has on its upper side an opening or slit extending over its whole length, and through which opening or slit the plastic concrete is filled into the spout or channel. On the lower side of this last, immediately beneath the upper opening or slit, and also extending over the whole length of the said spout is a second opening or slit and immediately above this and inside the spout or channel is a mechanical device for regulating the discharge of the plastic concrete out of the lower opening of spout and into the mould in which the pipe is formed. The construction of the spout or channel afore described is such that strips or layers of the plastic concrete extending from one extremity of the channel or spout to the other are allowed to fall, by degrees, into the mould in which the pipe is to be formed.

This spout or channel can be introduced through the tail-stock direct into the pipe form or mould fixed between the disc on the head-stock and the socket-ring on the tail-stock, until its extremity reaches within close proximity to the disc on the fixed head-stock.

The accompanying drawings will make more clear the process and illustrate by way of example, two forms of construction of a machine forming the mechanical device, with individual modifications forming parts of the device, and in addition, on a larger scale, section of pipe capable of being produced by the present process.

Fig. 1 showing the first example is a left hand side view of part of the machine.

Fig. 2 is the right hand side view.

Fig. 2ᵃ is a part of Fig. 2 on a larger scale.

Fig. 3 is a section on the line A—B of Fig. 1 on a larger scale.

Fig. 4 is a section on the line C—D of Fig. 1 on a larger scale.

Fig. 5 is a section on the line E—F of Fig. 1 on a larger scale.

Fig. 6 is a longitudinal section on a larger scale of a part of Fig. 2.

Fig. 7 is a section on the line G—H of Fig. 2 on a larger scale.

Fig. 8 is a section on the line I—K of Fig. 1 on a larger scale.

Fig. 9 is a section on the line L—M of Fig. 8.

Fig. 10 is a section on the line N—O of Fig. 8 on a larger scale.

Fig. 11 is a section on the line P—Q of Fig. 2 on a larger scale.

Fig. 12 shows a part of Fig. 1 in side view.

Fig. 13 is a partial side view of section of the form or mould with a pipe contained therein.

Fig. 14 is a section on the line R—S of Fig. 13.

Fig. 15 is an alternative to Fig. 7.

Fig. 16 is a vertical section and plan view of the device for charging the travelling spout or channel.

Fig. 17 is a part of Fig. 16 seen from above.

Fig. 18 is a portion of cross-section of a pipe enlarged produced by means of the process herein described.

Fig. 19 is a portion of cross-section of a pipe enlarged produced by means of the process herein described.

Fig. 20 is a side view of a second example of the construction of the machine.

Fig. 21 is a part of Fig. 20 on a larger scale.

Fig. 22 is a vertical section of same.

Fig. 23 is another part of Fig. 20 on a larger scale.

Fig. 24 is a vertical section of same.

Fig. 25 is a section on the line T—U of Fig. 24.

Fig. 26 is a portion of the interwoven reinforcement seen from above.

Fig. 27 is a side view of Fig. 26.

Fig. 28 is a second example of execution of a chain fastening. Fig. 29 is a plan view of same.

The machine in accordance with Figs. 1 and 2 is provided with a fixed head-stock 1 supporting a shaft 5 lodged in bearings 2, 3 and 4. On this shaft 5 rests a coupling disc 7 fixed by means of a key 6 Fig. 5. Furthermore resting on the shaft 5 is a loose rotary bush 8 provided with a gear wheel 9 and a driving pulley 10 serving as a second half coupling. Resting on this driving pulley 10 and slightly adjustable on its axis is a connecting ring 11 governed by claws 12 turning on the pins 13 of the driving pulley 10 and whose levers 14 with curved roller guides 15 rest on same and lie against a slide 16 resting on its axis on the bush 8 and shifted by means of the set-studs 17 of a swinging fork 19 fixed by pin 18 Fig. 5. The pin 18 rests in the bearing support 20 which is in rigid connection with the bearing 3 (Figs. 1 and 5). On the part of the shaft 5 lying between the bearings 3 and 4 is an adjustable gear wheel 22 (Figs. 3 and 4) running on a key 21. This gear wheel turns in the fork 23 of a lever 24 which also swings round the shaft 5. This lever carries a loose, rotary toothed wheel 25 which engages constantly in the toothed-wheel 22.

Parallel to the shaft 5 lies the main shaft 26 in the upper parts 3ᵃ and 4ᵃ of the bearings 3 and 4. This supports at one end the one portion 27 of a friction coupling, which, by means of a key turns with the shaft 26. The other portion 28 of this friction coupling is made to rotate, but cannot displace itself on its axis, on the shaft 26, and is connected with a gear-wheel 29. The gear wheel 29 (Figs. 1 and 5) engages through a gear wheel 30 with the gear-wheel 9. A fork 31 which is in rigid connection with the fork 19, engages with the studs 32 in a groove of the portion of coupling 27. On the pins 18 and forks 17 and 31 a tie-rod 33 is engaged which is in turn jointed to a shifting lever 34. Between the bearing heads 3ᵃ and 4ᵃ is fixed on the shaft 26 an interchangeable gear with four change speed gear wheels 35 in each of which (Fig. 4) the toothed wheel 25 of the lever 24 can be inserted, whereby the actual position of the pawl 24 is assured through the snapping to of a spring bolt 36ᵃ in one of the holes 36. Outside on the shaft 26 is fixed a chuck-plate or disc 37 provided with interchangeable funnel-shaped rings 38 (Figs. 1 and 13).

If the adjustment lever 34 is in the central position shown in Fig. 1 the claws 12 release somewhat the ring 11, so that the driving pulley 10 does not engage the friction disc 7.

In this case the gear wheel 9 with the bush 8 revolves so that the gear wheel 29 revolves also.

The upper friction-coupling 27 and 28 is, however, open so that the rotation of the parts 29 and 28 have no effect on the shaft 26, which is consequently at rest.

If, however, the lever 34 is swung to the left the slide 16 is also carried in the same direction and the levers 14 are able owing to the formation of the curved guide 15, to be drawn towards the outside so that the coupling 7—10 is opened still more. Through this displacement of the lever 34 the friction coupling 27 and 28 is closed at the top hence the driving pulley 10, over the toothed wheels 9, 30, 29 drives the frictional part 27 and with it the shaft 26, with the result that the disc 37 is made to revolve slowly.

If on the contrary the lever 34 is swung to the right, the slide 16 is also drawn to the right and the levers 14 are moved towards the axis 5, through the running of their rollers on the curved guides 15. By this movement the claws 12 press tightly against the connecting ring 11 so that friction between the parts 7 and 10 takes place, and the shaft 5 is driven directly by the driving pulley 10. It is true that the toothed wheel gearing 9, 30, 29 also revolves with same, but the coupling 27 and 28 is open at the top so that the rotary movement cannot be communicated to the shaft 26. The rotary movement is therefore communicated to the toothed wheel 22, over one of the interchangeable wheels 35 thrown in gear and to the shaft 26. It is now also possible to drive this shaft faster than before and in fact at four different speeds, and with the shaft, the disc 37. This has a special object which in explaining the method of working the machine will be described. The fixed head-stock is provided with the means of driving the disc 37 at greatly varying speeds.

The head-stock is placed opposite a travelling tail-stock 39, which is provided with a socket ring 40 carrying interchangeable rings 41 into which one end of the pipe mould is fixed. This tail-stock 39 is placed on rails 42 and is movable. The distance $x$ between the extremities of the rails and the disc 37 is approximately three feet, and the length $y$ of the rails is about 16 feet so that the tail-stock 39 can be advanced towards the head-stock as represented by the dotted lines in Fig. 1. By this method pipes of from approximately three to sixteen feet in length can be spun on one and the same machine. Between the two rings 38 and 41 the pipe mould 43 is fixed which process will be more fully explained later. For changing the position of the tail-stock 39 on the rails 42 (Figs. 8 and 9) a fixed spindle 45 not capable of rotating rests in fixed bearings 44, on which a rotary nut 46 lies provided with a worm-screw wheel 47, and with which an endless screw 48 engages. This screw is turned by means of a hand-wheel 49 (Figs. 1 and 8). The nut 46 rests between two bearings 50 fixed to the travelling tail-stock 39. By turning the hand-wheel 49 the tail-stock 39 is set in motion.

To securely lock the tail-stock on the rails 42 in the desired position, two revolving shafts 51 worked by two hand-wheels are made to act each of which is provided with two screws 52 directed in different directions and on which are nuts 53 carrying levers 54 which engage, when turned on the journals 55 on the tail-stock. These levers terminate in claws 56 that grip under the rails 42. By turning the shaft 51 the claws 56 can be driven under the rails 42 whereby the tail-stock 39 is fixed in position.

The ring 40 is fixed to a revolving socket 57 which is in turn mounted in the tail-stock, the socket resting free between rollers 58 (Figs. 8 and 10) the lower parts of which lie in an oil-bath. Each roller 58 (Fig. 10) is provided with ball-bearings 59 on shafts 60 in the casing of the tail-stock 39. The socket 57 is provided with a thrust ball-bearing 61. This is so arranged because the rotary action of the socket 57 is communicated from the disc 37 through the mould 43 to the ring 40.

The pipe mould 43 shows in its example of execution three sections, $43^a$, $43^b$ and $43^c$ (Figs. 13 and 14) forming together one outside wooden casing which, in order to reduce weight is formed of alternating spaced ribs forming slot-shaped openings 62. Sector-shaped channel irons 63 are fastened on the outside of the sections by means of screws, so that when the three sections are assembled, the channel irons form complete circles which on the one hand provide rigidity and on the other hand take the chains 64 which are drawn taut by means of screw bolt fastenings 65 or their alternative (Figs. 28, 29), and so the three longitudinal sections of the mould are held firmly together.

On the inside of the sections of mould is a lining of sheet-iron 66, which may, however, be omitted. This mould or form shown in Fig. 1 is, as mentioned, fitted into and between the conical shaped rings 38 and 41.

In order to fix the mould or form in and between the rings 38, 41 and to remove it from the machine, a travelling carriage 76 is provided (Figs. 1 and 12) placed rectangularly to the rails 42 on removable and adjustable rails 75 between the head-stock 1 and tail-stock 39. This carriage 76 is provided with inclined rollers 79 freely turning around their pivots and resting on two telescopic columns 77 which can be raised or lowered by means of ratchet hoists 78. It is possible, therefore, to catch up the mould or form 43 on to the rollers 79, to displace said mould axially on the rollers, raise and lower it.

Behind the tail-stock 39 (Fig. 2) is a movable material charging device formed as a travelling spout or channel. 67 denotes the carriage of the spout mounted on wheels 68, which in turn run on the rails 69. This spout or channel can be introduced so far through the hollow tail-stock 39 into the mould or form 43 that the closed end 70 at the front reaches within close proximity to the disc 37. The carriage 67 can be driven by means of a chain-gear 71 with handle 72. On the back of the carriage are two descending stays 73 to which the wheels 74 are connected gripping under the heads of rails 69, the object being to prevent the carriage overbalancing at the front. In the open bearing 80 of the carriage 67 the rear closed end 82$^a$ of the spout 82 is hung on trunnions 81 (Figs. 2 and 11) whereby the thrust-screw 83 is fitted at both sides (Fig. 2$^a$) on the furthermost rear-bearings, in order to assure the adjustment of the spout in a horizontal position. The part of the spout 82 (Figs. 2, 6 and 7) extending out in front of the carriage, as above on its upper side and extending over its whole length an opening or slit 84 through which the plastic concrete is charged into the spout, and on its under side a similar opening or slit 85 through which the concrete is discharged into the pipe mold 43. The walls 86 of the spout, in this example, are formed of arcuate channels held together by strengthening ties 87, and running through the centre of these and terminating in the metal disc 88 closing the spout at its extremity, is a mobile-rod 89 turned by a hand-wheel 90 reaching out of the spout. On this rod 89 in the interior of the spout 82 immediately above the discharge opening or slit 85 on the under side of same is an arcuate shutter 92 extending from one extremity of the opening 85 to the other and fastened to the rod by means of bolts 91. By turning the hand-wheel 90 from left to right or right to left the quadrant-shaped shutter 92 is also swung in either of these directions thus exposing the opening 85, so that the plastic concrete contained in the spout or channel 82 is discharged by degrees in strips or layers extending over the full length of the spout into the pipe mould or form 43. Inasmuch as the shutter 92, Fig. 6, is made in sections spread at their ends sufficiently to pass the strengthening ties 87, the shutter can be given a complete turn, so as to effectually force the mix from the interior of the trough and scrape it from its sides. This takes place after the spout or channel has been filled with the plastic concrete from one end to the other of its length and has been introduced into the mould or form 43. The spout 82 can also be formed like the section Fig. 15, whereby the shutter 92$^a$ over the discharge opening 85$^a$ can be worked by a hand-wheel 90$^a$ brought to the side and which is in turn worked by means of a worm-screw gear 93.

In order to fill the spout 82 with a plastic substance or concrete a device is provided represented in Figs. 16 and 17. 94 is an elevated recipient into which the mixed concrete is conveyed by means of a transporting device 95. From this recipient the concrete is dispatched through a chute 96 into a further recipient 97 placed under the chute 96 resting on a waggon 99 running on rails 98. The rails 98 are so laid, that a part of same 98$^a$ lies parallel to the spout 82. If the waggon 99 is in the position represented by Fig. 17, the upright plane 100 of the recipient 97 can be altered from its position in Fig. 16 right-hand to the position in Fig. 16 left hand and laid over in an inclined position, so that the material out of the recipient 97 on the waggon 99, can be transferred over the plane 100 into the spout 82. In order that this operation may take place without hindrance the plane 100 is provided in front with an adjustable clamp 101 with a guide board 102 guiding the material or plastic concrete through the upper opening or slit of the spout 82. After one section of the spout has been provided with material or plastic concrete the waggon 99 is then moved farther along in the direction of the arrow shown in Fig. 17, so that by degrees the spout or channel 82 becomes completely filled from one end to the other.

In the second constructional example shown in Figs. 20-25 the disposition of the machine is essentially the same, its construction, however, being simpler. 103 is the fixed headstock provided with a shaft 106 lodged in bearings 104 and 105. An adjustable friction-wheel or disc 107 is keyed on to the shaft 106, the friction wheel 107 moving backwards and forwards over the key. Its periphery rests against a friction disc 108 which in turn is driven by the driving pulley 109.

The bush 111 lodged in the bearing 110 is movable and a weight 112 tends constantly to press the bush 111 against the friction disc 108, and the latter against the friction disc 107, thus securing a reliable co-operation of both friction discs. In a groove in the hub 113 of the friction disc 107 engages an adjustable fork 114 having a nut operating on a spindle 116 actuated by a hand wheel 115, so that the speed of rotation between the driving pulley 109 and the socket 117 can be varied considerably. Between the socket 117 and the disc 118 the pipe-form or mould 119 is fixed. This pipe-form or mould may be either constructed of aluminium or consist of an exterior wooden casing lined with either zinc or sheet-iron, and is in sections. 120 is the travelling tail-stock in which a bush 121 by means of toothed gearing 122 is adjustable on its axis. In this fixed bush 121 a revolving bush 123 is lodged by means of ball-bearings 122$^a$, and on which the socket 118 is fixed. The tail-stock 120 travels on the rails 124 and may be locked thereto at a desired spot by means of a device not shown but similar to the gripping device of the first example of execution in Fig. 1. 125 is the travelling carriage provided with spout or channel 126 designed to contain the plastic substance. 127 is the hand-wheel governing the shutter in the interior of spout and which moves this shutter from left to right or right to left.

The Figs. 26 and 27 show the interwoven wire or wire netting from which the cylindrical reinforcement for the pipe is constructed. This wire shows in addition individual undulated longitudinal rods 128 which are held together by means of the interwoven cross wires 129, 130.

One way, for example, for carrying into effect the method by means of the apparatus is as follows:

A cylinder-shaped reinforcement is formed from the interwoven wire 128—130 and laid in the pipe-form or mould 43 (Fig. 13) in such a way that between this cylinder-shaped reinforcement and the sheet-iron or zinc lining 66 a space exists. The longitudinal sections of the pipe-form 43 are then fastened together by means of chains, hooks and screw-bolts and provided at each extremity with rings 131 and 132. Furthermore on the disc 37 and on the socket 40 angle-rings 38, 41 are fixed their diameter corresponding to the pipe-mould or form in which the pipe is spun. The lever 34 is in the position shown in Fig. 1 so that the shaft 26 does not revolve. The pipe-mould is thereupon and by means of the carriage 76 fixed between head-stock and tail-stock, this last 39 advanced so far towards the head-stock that the pipe mould becomes tightly fastened in between the two. The carriage 76 is then removed. The travelling spout or channel 82 is then filled with the plastic concrete by means of the device shown in Figs. 16 and 17, and introduced through the tail-stock 39 thence into the pipe-form 43. The starting lever 34 is then laid over to the left thus causing the shaft 26 and simultaneously the pipe form 43 to revolve at slow sped. By turning the hand-wheel 90 on the spout 82 from left to right and right to left longitudinal strips or layers of the plastic substance contained in the spout 82 are allowed to fall into the rotating pipe-form and are thrown against the interior wall of the pipe form through the meshes of the wire reinforcement 128 to 130 (Fig. 18). The result of this operation is that the component parts of the layer 133 of plastic substance or concrete in which the wire reinforcement is embedded remain mixed together, as owing to the slow rotary movement of the pipe-mould at this stage the plastic substance or concrete is simply thrown on to the inner wall of pipe-mould the effect of centrifugal force being excluded. This layer 133 is composed of numerous thin layers, that are formed during the continuous rotary movement in the shape of spirals or rings wound round one above the other, or, with interruptions or breaks in their continuity from time to time lie in the shape of concentric thin layers. As soon as these layers have reached a certain thickness, a fresh layer is added, but then the lever 34 is swung over to the right thus imparting a considerably increased movement of rotation whereby centrifugal action is attained.

It was then observed, that in the interior of the pipe structure a layer of cement 134 and a layer 135 of lime-hydrate had separated themselves from the concrete and covered the whole of the inner profile of the pipe. The advantage of this deposit of lime-hydrate on the inner surface of the pipe is that the concrete forming the body of pipe out of which the lime-hydrate is extracted is rendered proof against the corrosive influence of acids, as experiments have proved, hence the interior of such pipes cannot be affected by the acids contained in the soil in which the pipes are laid; they can, therefore, be employed without fear of corrosion for land-drainage.

Such pipes having a highly smooth inner-surface can furthermore be utilized as sewage pipes without fear to their structure being in any way affected by the acids contained in the impure waters passing through them.

The process herein described may be modified inasmuch as a proportion of the plastic concrete necessary for forming a pipe may be introduced into the pipe form, left to dry and a further proportion introduced, thus adding to the thickness of the pipe structure, and so forth.

In accordance with this process pipes for high pressure up to 30 atmospheres and more can be produced. As shown in Fig. 19 a layer 136 is introduced to embed the reinforcement followed by a layer of asphalt 137 a second reinforcement is then laid in to be in turn embedded in a further layer of concrete 138. Lastly the centrifugal action is communicated resulting in the layer of cement 134 and the lime-hydrate surface 135 being obtained.

The spout is not used for introducing the limpid asphalt into the mold. This is poured in in any manner and after being distributed by rotation—centrifugal action—can be cooled by introducing water, preparatory to the introduction of the second layer of cement.

The Figs. 28 and 29 are an alternative to the chain fastening for fixing and drawing taut the chain 64 (see Fig. 14). Two angle irons 140 are connected by screw-bolt 141 thus drawing the angle-irons together. The angle-irons are provided with hooks 142 in which links of the chain are hung. In the hook 142 a link 143 is engaged, and as shown in Fig. 29 narrows off at the other end. By this means it is possible to insert a chain link 144 in and through the link 143 (Fig. 28) so that the chain can be primarily tightened, a further tightening of the chain being realized through the screw 141.

I claim:

1. A method of producing hollow articles such as tubes, poles and the like of reinforced concrete, which consists in gradually depositing without centrifugal force a concrete mass whilst in plastic mortar-like condition as a first layer on the internal wall of a mould adapted to rotate round its axis, depositing layers of asphalt on said first layer of concrete, depositing further layers of concrete embedding thereby an iron reinforcement, and finally depositing a layer of cement under centrifugal action to cause the component parts of the cement to separate in accordance with their different specific gravities and to produce thus superimposed layers of cement and calcium hydrate upon the inner wall of the reinforced tube previously formed.

2. A method of producing hollow articles such as tubes, poles and the like of reinforced concrete, which consists in gradually depositing without centrifugal force a concrete mass whilst in plastic mortar-like condition, as a first layer on the internal wall of a mould adapted to rotate round its axis, leaving the layer produced to dry in the mould supplying hot liquid asphalt to the mould and depositing layers of asphalt on said first layer of concrete and leaving them to dry in the mould, depositing further layers of concrete and embedding thereby an iron reinforcement and leaving the layers to dry in the mould, and finally depositing a layer of cement under centrifugal action to cause the component parts of the cement to separate in accordance with their different specific gravities and to produce thus superimposed layers of cement and calcium hydrate upon the inner wall of the reinforced tube previously formed.

3. An apparatus for producing hollow articles such as tubes, poles and the like of reinforced concrete, comprising in combination a stationary head-stock having a clamping disc and means for driving the clamping disc at greatly varying speeds, a tail-stock having a rotary clamping disc, said clamping discs being provided with an interchangeable conical clamping-ring between which a mould is clamped, a sleeve adapted to rotate freely on rollers, the clamping disc on the tail-stock being mounted on said sleeve, means adapted to move said tail-stock towards and away from said head-stock and to securely lock the tail-stock at different distances from the head-stock, a movable material charging device arranged at the rear of the tail-stock and adapted to be introduced through the tail-stock into a tubular mould clamped between the clamping means and brought with its end close to the clamping means of the stationary head-stock.

4. An apparatus for producing hollow articles such as tubes, poles and the like of reinforced concrete, comprising in combination a stationary head-stock having clamping means and means for driving the clamping means at greatly varying speeds, a tail-stock having rotary clamping means, rails on which said tail-stock is movably arranged, grips adapted to temporarily lock the tail-stock to the rails, means for moving the tail-stock along said rails after the said locking device has been released, a movable material charging device arranged at the rear of the tail-stock and adapted to be introduced through the tail-stock into a tubular mould clamped between the clamping means and brought with its end close to the clamping means of the stationary head-stock.

5. An apparatus for producing hollow articles such as tubes, poles and the like of reinforced concrete, comprising in combination a stationary head-stock having clamping means and means for driving the clamping means at greatly varying speeds, a tail-stock having rotary clamping means, means adapted to move said tail-stock towards and away from said head-stock and to securely lock the tail-stock at different distances from the head-stock, a movable material charging device detachably mounted and horizontally adjusted on a carriage adapted to run with its wheels on rails and prevented from tilting forward by means of wheels engaging under the rails, said material charging device being adapted to be introduced through the tail-stock into a tubular mould clamped between the clamping means and brought with its end close to the clamping means of the stationary head-stock and provided at the top with a charging slit and at the bottom with a discharge slit and with an internal mechanical device for regulating the discharge.

6. An apparatus for producing hollow articles such as tubes, poles and the like of reinforced concrete, comprising in combination a stationary head-stock having clamping means and means for driving the clamping means at greatly varying speeds, a tail-stock having rotary clamping means, means adapted to move said tail-stock towards and away from the said head-stock and to securely lock the tail-stock at different distances from the head-stock, a movable material charging device detachably mounted and horizontally adjusted on a carriage adapted to run with its wheels on rails and prevented from tilting forward by means of wheels engaging under the rails, said material charging device being adapted to be introduced through the tail-stock into a tubular mould clamped between the clamping means and brought with its end close to the clamping means of the stationary head-stock and provided at the top with a charging slit extending over the whole of the length of the discharge device and serving for filling the device, and at the bottom with a slit reaching over the whole of the length of the discharge device and serving for discharging the concrete mass, and with a rocking slide co-operating with said bottom slit for controlling the discharge of the concrete mass in strips, over the whole length of the discharge device.

7. An apparatus for producing hollow articles such as tubes, poles and the like of reinforced concrete, comprising in combination a stationary headstock, having clamping means and means for driving the clamping means at greatly varying speeds, a tail-stock having rotary clamping means, means adapted to move said tail-stock towards and away from said head-stock and to securely lock the tail-stock at different distances from the head-stock, a movable material charging device detachably mounted and horizontally adjustable on a carriage adapted to run with its wheels on rails and prevented from tilting forward by means of wheels engaging under the rails, said material charging device being adapted to be introduced through the tail-stock into a tubular mould clamped between the clamping means and brought with its end close to the clamping means of the stationary head-stock and provided at the top with a charging slit extending over the whole of the length of the discharge device and serving for filling the device, and at the bottom with a slit reaching over the whole of the length of the discharge device and serving for discharging the concrete mass, and with a rocking-slide cooperating with said bottom slit for controlling the discharge of the concrete mass in strips, over the whole length of the discharge device, a carriage adapted to run between the head-stock and tail-stock at right angles to the line of movement of the tail-stock, inclined rollers provided on said carriage, and means to adjust these rollers in height, the rollers serving to support the mould during the operation of clamping and removing same.

8. An apparatus for producing hollow articles such as tubes, poles and the like of reinforced concrete, comprising in combination a stationary head-stock having clamping means and means for driving the clamping means at greatly varying speeds, a tail-stock having rotary clamping means, means adapted to move said tail-stock towards and away from said head-stock and to securely lock the tail-stock at different distances from the head-stock, a movable material charging device detachably mounted and horizontally adjustable on a carriage adapted to run with its wheels on rails and prevented from tilting forward by means of wheels engaging under the rails, said material charging device being adapted to be introduced through the tail-stock into a tubular mould clamped between the clamping means and brought with its end close to the clamping means of the stationary head-stock and provided at the top with a charging slit extending over the whole of the length of the discharge device and serving for filling the device, and at the bottom with a slit reaching over the whole of the length of the discharge device and serving for discharging the concrete mass, and with a rocking slide cooperating with said bottom slit for controlling the discharge of the concrete mass in strips, over the whole length of the discharge device, a waggon adapted to transport the concrete mass from a concrete mixer on rails placed parallel to the charging device, a chute provided on the waggon, and a guide-plate linked to the chute for directing the concrete mass into the charging slit of the charging device.

9. An apparatus for producing hollow articles such as tubes, poles and the like of reinforced concrete, comprising in combination, a stationary head-stock having clamping means and means for driving the clamping means at greatly varying speeds, a tail-stock having rotary clamping means, a mould clamped between the clamping means and comprising a wooden casing composed of several longitudinal arcuate sections partly slotted for the purpose of reducing weights, segments of channel iron provided on the casing, and chains housed in the groove of said channel irons and adapted to be tightened by means of a screw locking device for the purpose of holding the mould casing securely together.

10. In a cement pipe making machine, the combination with a horizontally supported rotatable mold; of a feed spout extending within and substantially the full length of the mold, and having a discharge slot throughout its length, a shutter arranged to control said slot and means to operate the shutter.

11. In a cement pipe making machine, the combination with a horizontally supported rotatable mold; of a carriage movable in a direction of the axis of the mold, a feed spout mounted on and projecting from said carriage and capable of being inserted in the mold substantially the full length thereof, said spout having a receiving slot in its top extending substantially the full length of the spout, and a similar discharge spout in its bottom, a slide in the spout controlling the bottom slot and means to rotate said slide with respect to the slot.

12. In a cement pipe making machine, the combination with a horizontally supported rotatable mold; of a feed spout extending within and substantially the full length of the mold and having a longitudinal feed slot and a longitudinal discharge slot, a shutter arranged to control the latter slot and means to rotate said shutter past both slots.

In testimony that I claim the foregoing as my invention, I have signed my name.

PAUL ZEHNDER.